(12) United States Patent
Zhang et al.

(10) Patent No.: US 10,616,752 B2
(45) Date of Patent: Apr. 7, 2020

(54) METHOD AND DEVICE FOR PROCESSING TERMINAL UNLOADING AND PROCESSING TERMINAL REGISTRATION

(71) Applicant: ZTE Corporation, Shenzhen (CN)

(72) Inventors: Zhihua Zhang, Shenzhen (CN); Fangting Zheng, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 29 days.

(21) Appl. No.: 15/518,027

(22) PCT Filed: Jun. 18, 2015

(86) PCT No.: PCT/CN2015/081885
§ 371 (c)(1),
(2) Date: Apr. 10, 2017

(87) PCT Pub. No.: WO2016/062111
PCT Pub. Date: Apr. 28, 2016

(65) Prior Publication Data
US 2017/0311150 A1    Oct. 26, 2017

(30) Foreign Application Priority Data
Oct. 20, 2014    (CN) .......................... 2014 1 0560274

(51) Int. Cl.
*H04W 8/04*    (2009.01)
*H04W 28/02*    (2009.01)
(Continued)

(52) U.S. Cl.
CPC ............... *H04W 8/04* (2013.01); *H04W 8/12* (2013.01); *H04W 28/0247* (2013.01);
(Continued)

(58) Field of Classification Search
CPC ... H04W 8/04; H04W 28/0247; H04W 36/22; H04W 8/12; H04W 88/14; H04W 8/065
See application file for complete search history.

(56) References Cited

U.S. PATENT DOCUMENTS

| 8,359,027 B2 | 1/2013 | Zhang | |
| 2010/0234019 A1* | 9/2010 | Zhang | H04W 8/04 455/432.1 |

(Continued)

FOREIGN PATENT DOCUMENTS

| CN | 101114927 A | 1/2008 |
| CN | 101472260 A | 7/2009 |

(Continued)

OTHER PUBLICATIONS

International Search Report for corresponding application No. PCT/CN2015/081885 filed on Jun. 18, 2015; dated Jul. 28, 2015.

(Continued)

*Primary Examiner* — Omar J Ghowrwal
(74) *Attorney, Agent, or Firm* — Cantor Colburn LLP

(57) ABSTRACT

The disclosure discloses a method and device for processing terminal unloading and processing terminal registration, and the method for processing terminal unloading includes that: a source Mobility Management Entity (MME) configures a mobility management entity identity for a terminal to be unloaded, in which the mobility management entity identity is used for indicating the terminal to register to a target MME configured with the mobility management entity identity after the terminal is unloaded from the source MME, and the mobility management entity identity is pre-configured on the source MME; and the source MME performs unloading for the terminal.

12 Claims, 7 Drawing Sheets

The source MME configures a mobility management entity identity for a terminal to be unloaded — S302

The source MME performs unloading for the terminal — S304

(51) Int. Cl.
    *H04W 36/22*     (2009.01)
    *H04W 8/12*     (2009.01)
    *H04W 88/14*     (2009.01)
    *H04W 8/06*     (2009.01)

(52) U.S. Cl.
    CPC ............ *H04W 36/22* (2013.01); *H04W 8/065* (2013.01); *H04W 88/14* (2013.01)

(56) References Cited

U.S. PATENT DOCUMENTS

| | | | |
|---|---|---|---|
| 2014/0126535 A1 | 5/2014 | Diachina | |
| 2016/0066219 A1* | 3/2016 | Poikonen | H04W 8/12 455/436 |
| 2017/0078968 A1* | 3/2017 | Shi | H04W 68/00 |

FOREIGN PATENT DOCUMENTS

| | | | | |
|---|---|---|---|---|
| CN | 102056130 A | 5/2011 | | |
| CN | 102281586 A | 12/2011 | | |
| CN | 103974213 A | 8/2014 | | |
| EP | 2265054 A1 | 12/2010 | | |
| EP | 2265054 B1 * | 12/2010 | ............ | H04L 47/10 |
| WO | WO-2009115041 A1 * | 9/2009 | ............ | H04L 47/10 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); vol. RAN WG2, No. V12.3.0, Sep. 18, 2014, pp. 1-215, XP0580925619.

3rd Generation Partnership Project; Technical Specification Group Radio Access Network; Evolved Universal Terrestrial Radio Access Network (E-UTRAN); S1 Application Protocol (S1AP); vol. RAN WG3, No. V12.3.0., Sep. 19, 2014, pp. 1-290, XP050925530.

3rd Generation Partnership Project; Technical Specification Group Services and System Aspects; General Packet Radio Service (GPRS) enhancements for Evolved Universal Terrestrial Radio Access Network (E-UTRAN) access; Sep. 24, 2014, XP050872451.

3rd Generation Partnership Project;Technical Specification Group Core Network and Terminals; Non-Access-Stratum (NAS) protocol for Evolved Packet System (EPS); vol. CT WG1, No. V12.6.0, Sep. 26, 2014, pp. 1-370, XP050925974.

European Search Report for corresponding application EP15853276; Report dated Sep. 18, 2017.

* cited by examiner

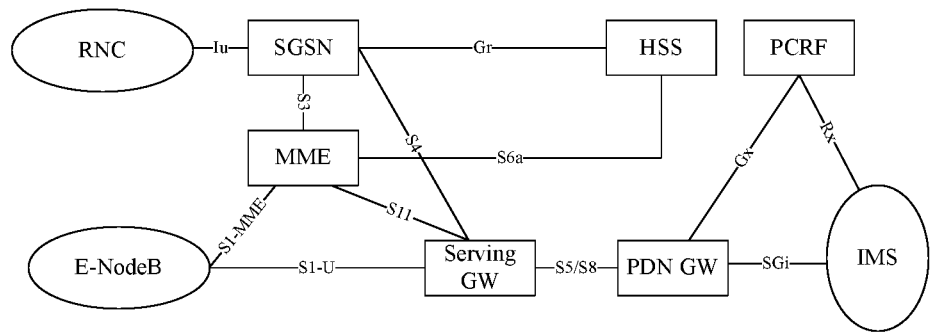

Fig. 1

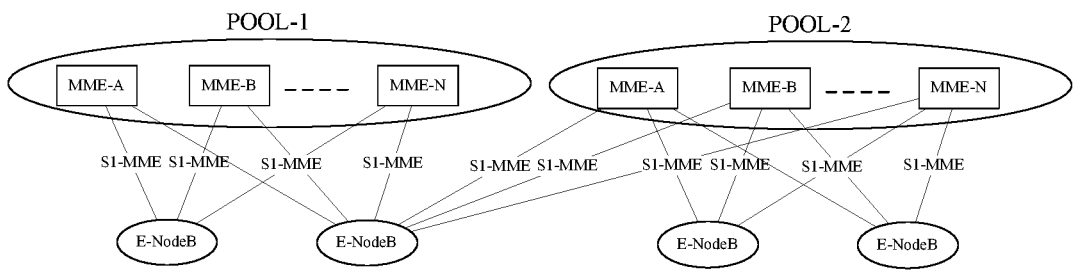

Fig. 2

| The source MME configures a mobility management entity identity for a terminal to be unloaded | S302 |

| The source MME performs unloading for the terminal | S304 |

Fig. 3

| The target MME receives a message, in which the message carries a mobility management entity identity, which is used for indicating the terminal to register to the target MME configured with the mobility management entity identity after the terminal is unloaded from a source MME, and the mobility management entity identity is pre-configured on the source MME | S402 |

| The target MME registers the terminal on the target MME according to the mobility management entity identity | S404 |

Fig. 4

METHOD AND DEVICE FOR PROCESSING TERMINAL UNLOADING AND PROCESSING TERMINAL REGISTRATION

TECHNICAL FIELD

The disclosure relates to the field of communications, and in particular to a method and device for processing terminal unloading and processing terminal registration.

BACKGROUND

Long Term Evolution (LTE) is a LTE of an Universal Mobile Telecommunications System (UMTS) technology standard developed by a 3rd Generation Partnership Project (3GPP). Under a guidance of this evolution plan, a new mobile communication network architecture is defined, namely, a System Architecture Evolution (SAE) network architecture. FIG. 1 is a schematic diagram of a mobile communication network architecture according to a first example in the related art. As shown in FIG. 1, the following network elements are included:

an Evolved Wireless Access Network (E-RAN), which can provide higher uplink and downlink rates, lower transmission delay and more reliable wireless transmission, in which a network element included in the E-RAN is an Evolved NodeB (eNodeB), which provides radio resources for an access of a terminal;

a Home Subscriber Server (HSS), which permanently store user contract data;

a Mobility Management Entity (MME), which is a control panel functional entity, temporarily storing a server of user data, responsible for managing and storing UE contexts (such as an UE identity, a user identity, mobility management status, user security parameters, etc.), assigning a temporary identity for the user when an UE is stationed in a tracking area or a network is responsible for authenticating a user; processing all non-access layer messages between the MME and the UE; and triggering aging on the SAE;

a Serving Gateway (GW), which is a user plane entity, responsible for routing and processing user plane data and terminating downlink data of the UE in a idle state, managing and storing an SAE bearer context of the UE, such as IP bearer service parameters and network internal routing information, and the like, in which the GW is an anchor of a user plane inside a 3GPP system, and the user can only have one Serving GW at a time;

a Packet Data Network Gateway (PDN GW), which is a GW responsible for the UE accessing the PDN, assigning the IP address for the user, and being used as a mobile anchor of the 3GPP and a non-3GPP access system at the same time, in which the user can access multiple PDN GWs at the same time; and a Policy and Charging Rule Functionality Entity (referred to as PCRF), which generates a Quality of Service (Qos) rule and a charging rule for controlling user data transfer mainly according to service information and user contract information and operator configuration information and can also control the establishment and release of the bearer in the access network.

FIG. 2 is a schematic diagram of a mobile communication network architecture according to a second example in the related art. As shown in FIG. 2, a plurality of MME network elements in the SAE network may constitute a POOL, and an MME POOL area indicates that the UE does not need to change a area serving the MME. One MME POOL area has one or more peer MMEs, and an eNB within the MME POOL area is connected to each MME.

By setting up MME POOL, when the UE moves within the MME POOL area, it is not necessary to switch an MME node, which can effectively reduce signaling interaction between systems. In the POOL, users can be distributed in various MMEs in a balanced manner, ensuring a consistency of a load on each MME within the POOL and a processing capacity of each MME. At the same time, if the processing capacity of each MME changes, all or part of the users in the MME can be unloaded to other MMEs through a load unloading. After a MME is not available in the POOL, other MMEs in the POOL can take over the users under a faulty MME.

When a certain MME performs load unloading, the users in this MME will be unloaded into the POOL or in an MME outside the POOL for distribution based on a weight, and the users in this MME cannot be migrated to a specified MME.

There is no valid solution for a problem that a user in an MME cannot be migrated to another specified MME in the related art.

SUMMARY

The disclosure provides a method and device for processing terminal unloading and processing terminal registration, so as at least to solve a problem in the related art that a user in an MME cannot be migrated to another specified MME.

In an embodiment of the disclosure, a method for processing terminal unloading is provided, which includes that: configuring, by a source Mobility Management Entity (MME), a mobility management entity identity for a terminal to be unloaded, wherein the mobility management entity identity is used for indicating the terminal to register to a target MME configured with the mobility management entity identity after the terminal is unloaded from the source MME, and the mobility management entity identity is preconfigured on the source MME; and performing, by the source MME, unloading for the terminal.

In an example embodiment, before configuring, by the source MME, the mobility management entity identity for the terminal to be unloaded, the method further comprises: receiving, by the source MME, a Tracking Area Update (TAU) request or an attachment request sent by the terminal; and after configuring, by the source MME, the mobility management entity identity for the terminal to be unloaded, the method further comprises: carrying, by the source MME, a Globally Unique MME (GUMME) in a TAU accept message or an attachment accept message.

In an example embodiment, before configuring, by the source MME, the mobility management entity identity for the terminal to be unloaded, the method further comprises: detecting, by the source MME, that the terminal is in a connection state; and after configuring, by the source MME, the mobility management entity identity for the terminal to be unloaded, the method further comprises: carrying, by the source MME, the mobility management entity identity in a Globally Unique Temporary UE identity (GUTI) redistribution request message.

In an example embodiment, the mobility management entity identity is a Globally Unique MME identity (GUMMEI).

In another embodiment of the disclosure, a method for processing terminal registration is provided, which includes that: receiving, by a target Mobility Management Entity (MME), a message, wherein the message carries a mobility management entity identity, which is used for indicating a terminal to register to the target MME configured with the mobility management entity identity after the terminal is unloaded from a source MME, and the mobility management entity identity is pre-configured on the source MME; and registering, by the target MME, the terminal on the target MME according to the mobility management entity identity.

In an example embodiment, the target MME registers the terminal on the target MME according to the mobility management entity identity, comprising: determining, by the target MME, that the terminal is unloaded from the source MME according to the mobility management entity identity; acquiring, by the target MME, an address of the source MME, and initiating a context request message to the source MME; and acquiring, by the target MME, context information of the terminal from a response message, which corresponds to the context request message and is sent by the source MME, and saving, by the target MME, the context information.

In an example embodiment, the target MME receives the message, comprising: receiving, by the target MME, a Tracking Area Update (TAU) request message sent by a base station, wherein the TAU request message carries the mobility management entity identity, and the TAU request message is sent from the terminal to the base station after the terminal is unloaded from the source MME.

In an example embodiment, the mobility management entity identity is a Globally Unique MME identity (GUMMEI).

In another embodiment of the disclosure, a method for processing terminal registration is provided, which includes that: receiving, by a base station, a request message sent by a terminal; determining, by the base station, that a source Mobility Management Entity (MME) of the terminal has configured a mobility management entity identity for the terminal, wherein the mobility management entity identity is used for indicating the terminal to register to a target MME configured with the mobility management entity identity after the terminal is unloaded from the source MME; and selecting, by the base station, the terminal to the target MME that supports the mobility management entity identity.

In an example embodiment, the request message is a Tracking Area Update (TAU) request message.

In an example embodiment, before the base station receives the request message sent by the terminal, the method further comprises: receiving, by the base station, a message sent by the target MME, wherein the message carries the mobility management entity identity.

In an example embodiment, the mobility management entity identity is a Globally Unique MME identity (GUMMEI).

In another embodiment of the disclosure, a device for processing terminal unloading is provided, applied to a source MME, which includes: a configuring component arranged to configure a mobility management entity identity for a terminal to be unloaded, wherein the mobility management entity identity is used for indicating the terminal to register to a target MME configured with the mobility management entity identity after the terminal is unloaded from the source MME, and the mobility management entity identity is pre-configured on the source MME; and an unloading component arranged to perform unloading for the terminal.

In an example embodiment, the device further comprises: a first receiving component arranged to receive a Tracking Area Update (TAU) request or an attachment request sent by the terminal before the source MME configures the mobility management entity identity for the terminal to be unloaded; and a first carrying component arranged to carry a Globally Unique MME (GUMME) in a TAU accept message or an attachment accept message after the source MME configures the mobility management entity identity for the terminal to be unloaded.

In an example embodiment, the device further comprises: a detecting component arranged to detect that the terminal is in a connection state before the source MME configures the mobility management entity identity for the terminal to be unloaded; and a second carrying component arranged to carry the GUMME in a Globally Unique Temporary UE identity (GUTI) redistribution request message after the source MME configures the mobility management entity identity for the terminal to be unloaded.

In another embodiment of the disclosure, a device for processing terminal registration is provided, applied to a target MME, which includes: a second receiving component arranged to receive a message, wherein the message carries a mobility management entity identity, which is used for indicating a terminal to register to the target MME configured with the mobility management entity identity after the terminal is unloaded from a source MME, and the mobility management entity identity is pre-configured on the source MME; and a first registering component arranged to register the terminal on the target MME according to the mobility management entity identity.

In an example embodiment, the first registering component comprises: a determining element arranged to determine that the terminal is unloaded from the source MME according to the mobility management entity identity; an initiating element arranged to acquire an address of the source MME, and initiate a context request message to the source MME; and an acquiring element arranged to acquire context information of the terminal from a response message, which corresponds to the context request message and is sent by the source MME, and save the context information.

In an example embodiment, the second receiving component comprises: a receiving element arranged to receive a Tracking Area Update (TAU) request message sent by a base station, wherein the TAU request message carries the mobility management entity identity, and the TAU request message is sent from the terminal to the base station after the terminal is unloaded from the source MME.

In another embodiment of the disclosure, a device for processing terminal registration is provided, applied to a base station, which includes: a third receiving component arranged to receive a request message sent by a terminal; a determining component arranged to determine that a source Mobility Management Entity (MME) of the terminal has configured a mobility management entity identity for the terminal, wherein the mobility management entity identity is used for indicating the terminal to register to a target MME configured with the mobility management entity identity after the terminal is unloaded from the source MME; and a selecting component arranged to select the terminal to the target MME that supports the mobility management entity identity.

In an example embodiment, the device further comprises: a fourth receiving component arranged to receive a message sent by the target MME, wherein the message carries the mobility management entity identity.

According to embodiments of the disclosure, the source MME is used to configure the mobility management entity identity for the terminal to be unloaded, in which the mobility management entity identity is used for indicating the terminal to register to the target MME configured with the mobility management entity identity after the terminal is unloaded from the source MME, and the mobility management entity identity is pre-configured on the source MME; and the source MME performs unloading for the terminal. The problem in the related art that the user in the MME cannot be migrated to the other specified MME is solved, and an effect that the user can be unloaded to the other specified MME is achieved.

BRIEF DESCRIPTION OF THE DRAWINGS

The drawings are described here to provide further understanding of the disclosure, and form a part of the present application. The schematic embodiments and description of the disclosure are adopted to explain the disclosure, and do not form improper limits to the disclosure. In the drawings:

FIG. 1 is a schematic diagram of a mobile communication network architecture according to a first example in the related art;

FIG. 2 is a schematic diagram of a mobile communication network architecture according to a second example in the related art;

FIG. 3 is a flow diagram of a method for processing terminal unloading according to an embodiment of the disclosure;

FIG. 4 is a flow diagram of a method for processing terminal registration according to a first example embodiment of the disclosure;

DETAILED DESCRIPTION

Figure 5:
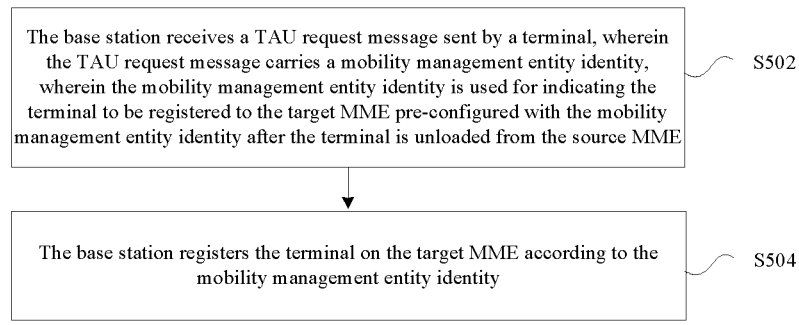
FIG. 5 is a flow diagram of a method for processing terminal registration according to a second example embodiment of the disclosure.

The disclosure is described below with reference to the drawings and the embodiments in detail. It is to be noted that the embodiments in the present application and the characteristics in the embodiments may be combined with each other under the condition of no conflicts.

In the present embodiment, there is provided a method for processing terminal unloading. FIG. 3 is a flow diagram of a method for processing terminal unloading according to an embodiment of the disclosure. As shown in FIG. 3, the flow includes the following steps.

Step S302: The source MME configures a mobility management entity identity for a terminal to be unloaded, in which the mobility management entity identity is used for indicating the terminal to register to a target MME configured with the mobility management entity identity after the terminal is unloaded from the source MME, and the mobility management entity identity is pre-configured on the source MME.

Step S304: The source MME performs unloading for the terminal.

By the above steps, the source MME configures the mobility management entity identity for the terminal to be unloaded, and performs the unloading processing for the terminal. After the terminal is unloaded, the mobility management entity identity can be used for registering the terminal to the target MME configured with the mobility management entity identity. The problem in the related art that a user in an MME cannot be migrated to another specified MME is solved, so that the user can be unloaded to the other specified MME, which facilitates a network maintenance of an operator.

In the present embodiment, the mobility management entity identity may be configured for the terminal in the following manner: before the source MME configures the mobility management entity identity for the terminal to be unloaded, when the source MME receives a TAU request or an attachment request sent by the terminal, the mobility management entity identity is configured for the terminal in such a manner that the GUMME is carried in a TAU accept message or an attachment accept message. Alternatively, if before the source MME configures the mobility management entity identity for the terminal to be unloaded, the source MME detects that the terminal is in a connection state, the mobility management entity identity is configured for the terminal in such a manner that the GUMME is carried in a GUTI redistribution request message.

The above steps are described from a viewpoint of the source MME. In the present embodiment, there is also provided a method for processing terminal registration, which is described from the target MME. FIG. 4 is a flow diagram of a method for terminal registration processing according to a first example embodiment of the disclosure. As shown in FIG. 4, the flow includes the following steps.

Step S402: The target MME receives a message, in which the message carries a mobility management entity identity, which is used for indicating the terminal to register to the target MME configured with the mobility management entity identity after the terminal is unloaded from a source MME, and the mobility management entity identity is pre-configured on the source MME.

Step S404: The target MME registers the terminal on the target MME according to the mobility management entity identity.

By the above steps, the target MME receives a message, which carries a mobility management entity identity, in which the mobility management entity identity is used for indicating the terminal to register to the target MME configured with the mobility management entity identity after the terminal is unloaded from the source MME, and the mobility management entity identity is pre-configured on the source MME. The terminal is registered on the target MME according to the mobility management entity identity. The problem in the related art that a user in the MME cannot be migrated to the other specified MME is solved, so that the user can be unloaded to the other specified MME, which facilitates the network maintenance of the operator.

In the present embodiment, the target MME registers the terminal on the target MME according to the mobility management entity identity, including that: the target MME determines that the terminal is unloaded from the source MME according to the mobility management entity identity; acquires an address of the source MME, and initiates a context request message to the source MME; and after the source MME sends a response message corresponding to the context request message, the target MME acquires context information of the terminal from the response message, and saves the context information so that the terminal is successfully registered in the target MME.

In an alternative embodiment, the target MME receives the message, which may include that: the target MME receives a TAU request message sent by a base station, wherein the TAU request message carries the mobility management entity identity, and the TAU request message is sent from the terminal to the base station after the terminal is unloaded from the source MME.

The above steps are described from a viewpoint of the target MME. In the present embodiment, there is also provided a method for processing terminal registration, which is described from the base station. FIG. 5 is a flow diagram of a method for processing terminal registration according to a second embodiment of the disclosure. As shown in FIG. 5, the flow includes the following steps.

Step S502: The base station receives a TAU request message sent by a terminal, wherein the TAU request message carries a mobility management entity identity, wherein the mobility management entity identity is used for indicating the terminal to be registered to the target MME pre-configured with the mobility management entity identity after the terminal is unloaded from the source MME.

Step S504: The base station registers the terminal on the target MME according to the mobility management entity identity.

By the above steps, the base station receives a TAU request message, which carries the mobility management entity identity, wherein the mobility management entity identity is used for indicating the terminal to register to the target MME pre-configured with the mobility management entity identity after the terminal is unloaded from the source MME; the terminal is registered on the target MME according to the mobility management entity identity. The problem in the related art that the user in the MME cannot be migrated to the other specified MME is solved, so that the user can be unloaded to the specified MME, which facilitates the network maintenance of the operator.

As an example embodiment, the base station receives the MME update request message sent by the target MME before the base station receives the TAU request message sent by the terminal, and the update request message carries the mobility management entity identity so that the base station can determine that the terminal is registered on the target MME after the terminal is unloaded.

As an alternative, the above mobility management entity identity may be GUMMEI.

In the present embodiment, there are also provided several devices for implementing the above embodiments and alternative embodiments. Those that have been described will not be described in detail. As used herein, the term "component" may implement a combination of at least one of software and hardware of a predetermined function. Although devices described in the following embodiments may be implemented in software, the implementation of hardware, or a combination of software and hardware, is also possible and conceivable.

Figure 6:
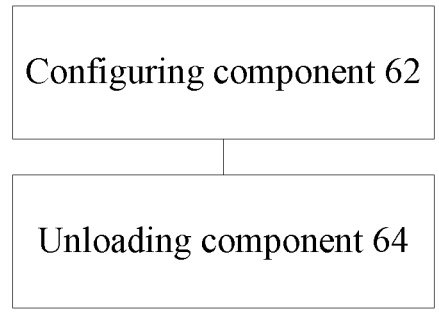
FIG. 6 is a block diagram of a device for processing terminal unloading according to an embodiment of the disclosure.

FIG. 6 is a block diagram of a device for processing terminal unloading according to an embodiment of the disclosure. As shown in FIG. 6, the device includes a configuring component 62 and an unloading component 64. The device has described in detail the method steps shown in FIG. 3, and will not repeat the method steps here. Each component will be described briefly below.

The configuring component 62 is arranged to configure a mobility management entity identity for a terminal to be unloaded, wherein the mobility management entity identity is used for indicating the terminal to register to a target MME configured with the mobility management entity identity after the terminal is unloaded from the source MME, and the mobility management entity identity is pre-configured on the source MME.

The unloading component 64 is arranged to perform unloading for the terminal.

Figure 7:
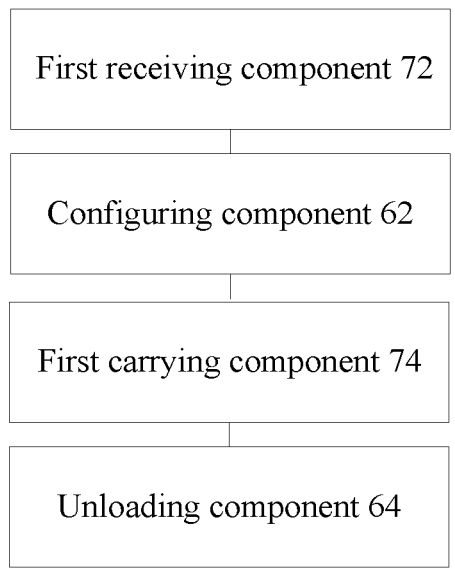
FIG. 7 is a block diagram of a device for processing terminal unloading according to a first example embodiment of the disclosure.

FIG. 7 is a block diagram of a device for terminal unloading processing according to a first example embodiment of the disclosure. As shown in FIG. 7, the device further includes:

a first receiving component 72 arranged to receive a TAU request or an attachment request sent by the terminal before the source MME configures the mobility management entity identity for the terminal to be unloaded; and a first carrying component 74 arranged to carry the GUMME in a TAU accept message or an attachment accept message after the source MME configures the mobility management entity identity for the terminal to be unloaded.

Figure 8:
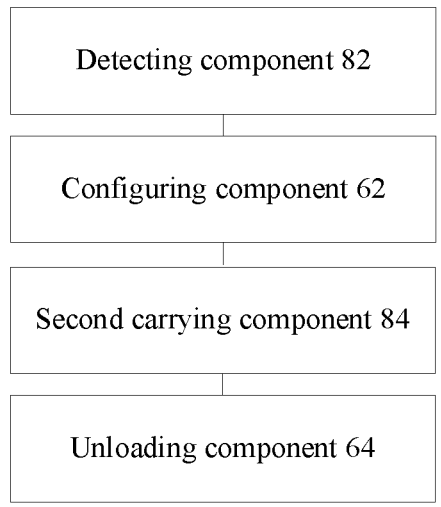
FIG. 8 is a block diagram of a device for processing terminal unloading according to a second example embodiment of the disclosure.

FIG. 8 is a block diagram of a device for terminal unloading processing according to a second example embodiment of the disclosure. As shown in FIG. 8, the device further includes:

a detecting component 82 arranged to detect that the terminal is in a connection state before the source MME configures the mobility management entity identity for the terminal to be unloaded; and a second carrying component 84 arranged to carry the GUMME in a GUTI redistribution request message after the source MME configures the mobility management entity identity for the terminal to be unloaded.

Figure 9:
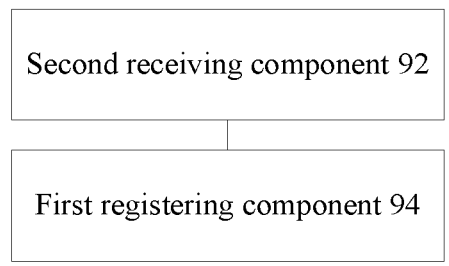
FIG. 9 is a block diagram of a device for processing terminal registration according to a first example embodiment of the disclosure.

The embodiment of the disclosure also provides a device for processing terminal registration, applied to a target MME. FIG. 9 is a block diagram of a device for processing terminal registration according to a first example embodiment of the disclosure. As shown in FIG. 9, the device includes a second receiving component 92 and a first registering component 94. The device has described in detail the method steps shown in FIG. 4, and will not repeat the method steps here. Each component will be described briefly below.

The second receiving component 92 is arranged to receive a message, wherein the message carries a mobility management entity identity, which is used for indicating a terminal to register to the target MME configured with the mobility management entity identity after the terminal is unloaded from a source MME, and the mobility management entity identity is pre-configured on the source MME.

The first registering component 94 is arranged to register the terminal on the target MME according to the mobility management entity identity.

Figure 10:
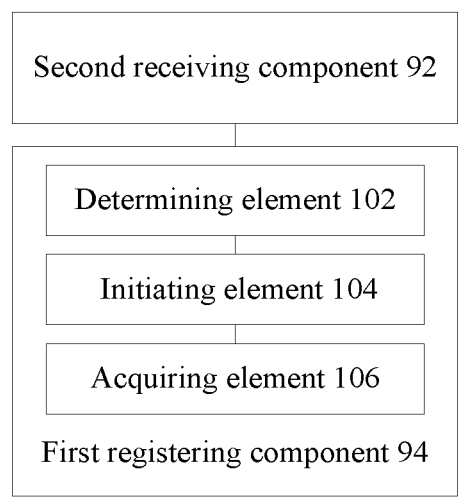
FIG. 10 is a block diagram of a device for processing terminal registration according to a second example embodiment of the disclosure.

FIG. 10 is a block diagram of a device for processing terminal registration according to a first example embodiment of the disclosure. As shown in FIG. 10, the first registering component 94 includes:

a determining element 102 arranged to determine that the terminal is unloaded from the source MME according to the mobility management entity identity;

an initiating element 104 arranged to acquire an address of the source MME, and initiate a context request message to the source MME; and an acquiring element 106 arranged to acquire context information of the terminal from a response message, which corresponds to the context request message and is sent by the source MME, and save the context information.

Figure 11:
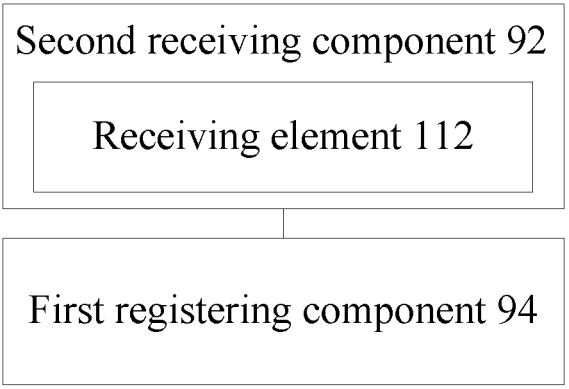
FIG. 11 is a block diagram of a device for processing terminal registration according to a second example embodiment of the disclosure.

FIG. 11 is a block diagram of a device for processing terminal registration according to a second example embodiment of the disclosure. As shown in FIG. 11, the second receiving component 92 includes:

a receiving element 112 arranged to receive a TAU request message sent by a base station, wherein the TAU request message carries the mobility management entity identity, and the TAU request message is sent from the terminal to the base station after the terminal is unloaded from the source MME.

Figure 12:
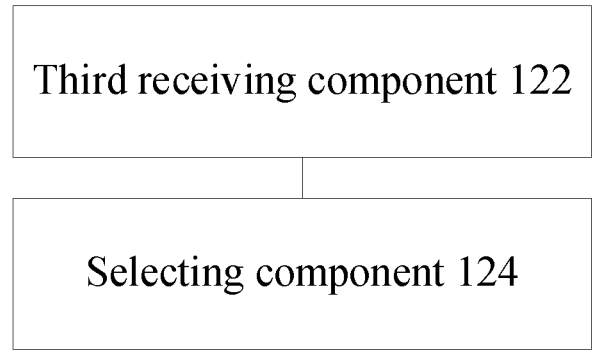
FIG. 12 is a block diagram of a device for processing terminal registration according to a second example embodiment of the disclosure.

The embodiment of the disclosure also provides a device for processing terminal registration, applied to a base station. FIG. 12 is a block diagram of a device for processing terminal registration according to a second example embodiment of the disclosure. As shown in FIG. 12, the device includes a third receiving component 122 and a selecting component 124. The device has described in detail the method steps shown in FIG. 5, and will not repeat the method steps here. Each component will be described briefly below.

The third receiving component 122 is arranged to receive a request message sent by a terminal; the determining component is arranged to determine that a source MME of the terminal has configured a mobility management entity identity for the terminal, wherein the mobility management entity identity is used for indicating the terminal to register to a target MME configured with the mobility management entity identity after the terminal is unloaded from the source MME; and the selecting component 124 is arranged to select the terminal to the target MME that supports the mobility management entity identity.

Figure 13:
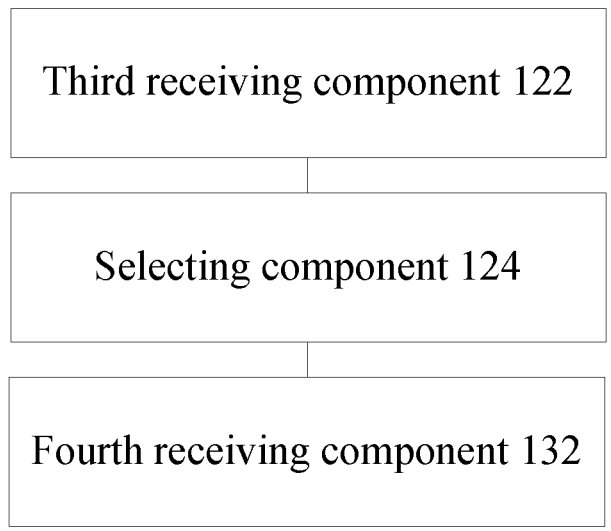
FIG. 13 is a block diagram of a device for processing terminal registration according to a third example embodiment of the disclosure.

FIG. 13 is a block diagram of a device for processing terminal registration according to a third example embodiment of the disclosure. As shown in FIG. 13, the device further includes a fourth receiving component 132 arranged to receive a message sent by the target MME, which carries the mobility management entity identity.

In the above embodiments and alternative embodiments, the mobility management entity identity is used, which may be implemented in a variety of ways, as long as it is possible to identify that it is unloaded from the source MME and needs to be registered to the target MME. As an alternative implementation, the identity may be the GUMMEI, which may be used to reduce changes to the existing MME. Hereinafter, the mobility management entity identity is GUMMEI as an example, and it will be described in combination with an alternative embodiment.

In an alternative embodiment, the GUMMEI dedicated for unloading is configured for the terminal to be unloaded before the terminal is unloaded for the source MME so that the terminal can be registered to the target MME pre-configured with the GUMMEI after the terminal is unloaded from the source MME.

The present alternative embodiment is applicable to a scene in which MME load unloading is performed in a MME POOL or between MME POOLs, but is not limited thereto. In the present alternative embodiment, when an MME-A needs to unload the user to a specified MME-B (where MME-B and MME-A may be the same POOL and may be different POOLs), the GUMMEI dedicated for unloading is configured in the MME-A. The GUMMEI is newly added and configured in the MME-B at the same time, and an MME Configuration Update Request message is triggered to carry the GUMMEI and sent to all the eNodeBs management by the MME-B. The user initiates the attachment or TAU service to the MME-A, and the MME-A determines that the user needs to be unloaded, assigns the GUMMEI dedicated for unloading, and informs the user of immediately initiating the TAU again. The user initiates the TAU again, and the eNodeB will select the MME-B for the user according to the user identifier GUMMEI in the TAU message, and finally, the user is registered to the MME-B.

Figure 14:
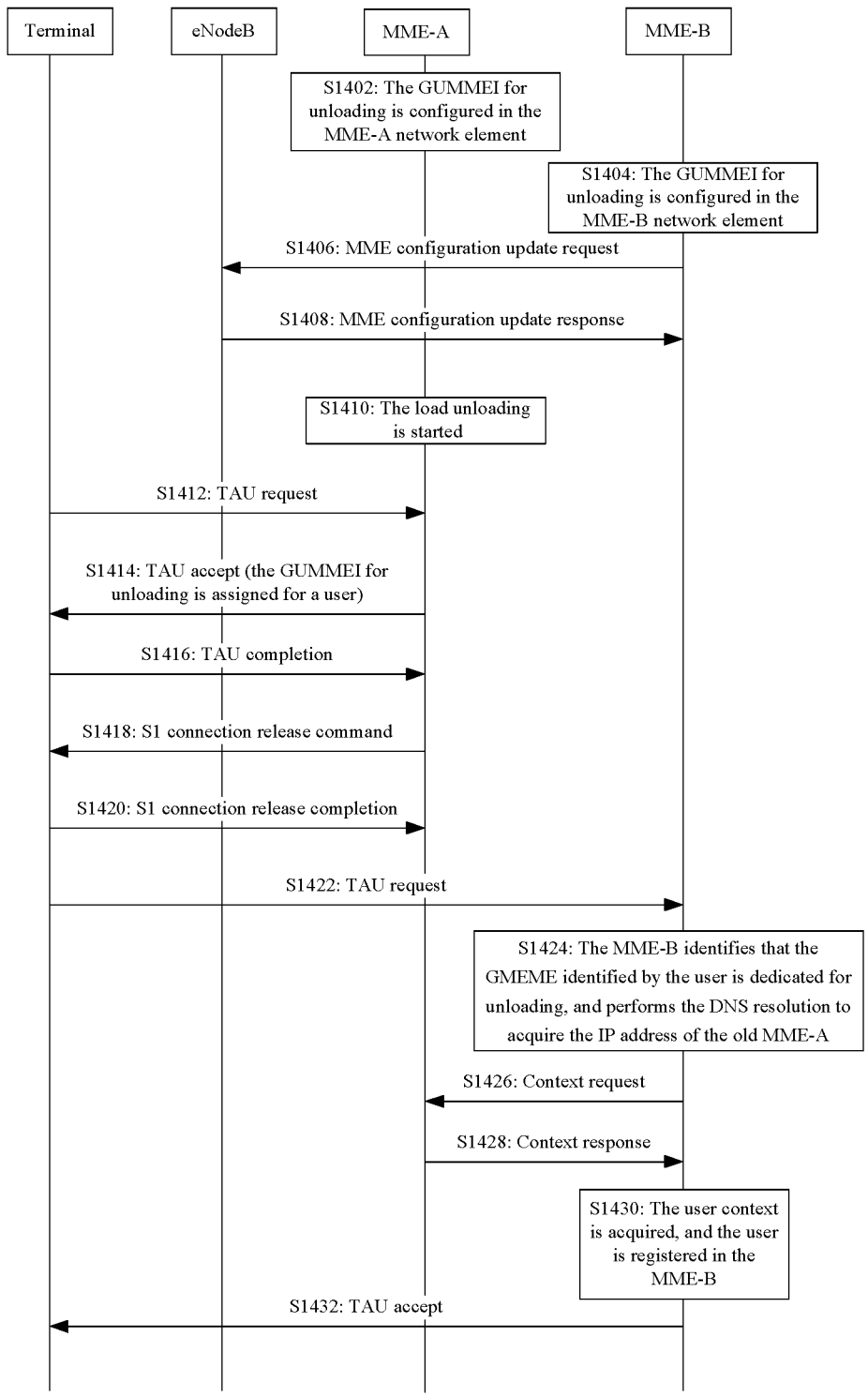
FIG. 14 is a schematic diagram of an MME load unloading according to a first example embodiment of the disclosure.

FIG. 14 is a schematic diagram of an MME load unloading according to a first example embodiment of the disclosure. One embodiment of the disclosure of the MME load unloading is as shown in FIG. 14. After starting the load unloading, an MME-A receives a TAU service initiated by a user, assigns a GUMMEI dedicated for unloading to the user so that the user selects an unloaded target MME-B at a next TAU, and finally the user is unloaded to the specified MME-B. The following steps are included.

Step S1402: The GUMMEI dedicated for unloading is configured in the MME-A as an unloading source before the load is unloaded.

Step S1404: The GUMMEI dedicated for unloading is configured in the MME-B as an unloading target before the load is unloaded.

Step S1406: The MME-B sends an MME configuration update request message to the eNodeB, which carries the GUMMEI supported by the MME-B and contains the GUMMEI dedicated for unloading.

Step S1408: The eNobeB returns the configuration update response message, indicating that configuration modification has been accepted.

Step S1410: The MME-A network element starts the load unloading by operating a maintenance and management tool.

Step S1412: The MME-A receives a TAU request initiated by a terminal.

Step S1414: The MME-A assigns the GUMMEI dedicated for unloading for the terminal, and carries the GUMMEI in a TAU accept message.

Step S1416: The terminal returns a TAU completion.

Step S1418: The MME-A initiates 51 connection release.

Step S1420: The terminal returns 51 connection release completion.

Step S1422: The terminal issues a TAU request message again, and the eNobeB network element selects the user to the MME-B based on the GUMMEI therein.

Step S1424: The MME-B identifies that the GMEME identified by the user is dedicated for unloading, and performs a DNS resolution to acquire an IP address of the old MME-A.

Step S1426: The MME-B initiates a context request message to the MME-A.

Step S1428: The MME-A returns a context response message carrying user context information of the terminal.

Step S1430: The MME-B saves the user context information of the terminal, and the terminal is registered in the MME-B.

Step S1432: The MME-B returns a TAU accept message to the terminal.

Figure 15:
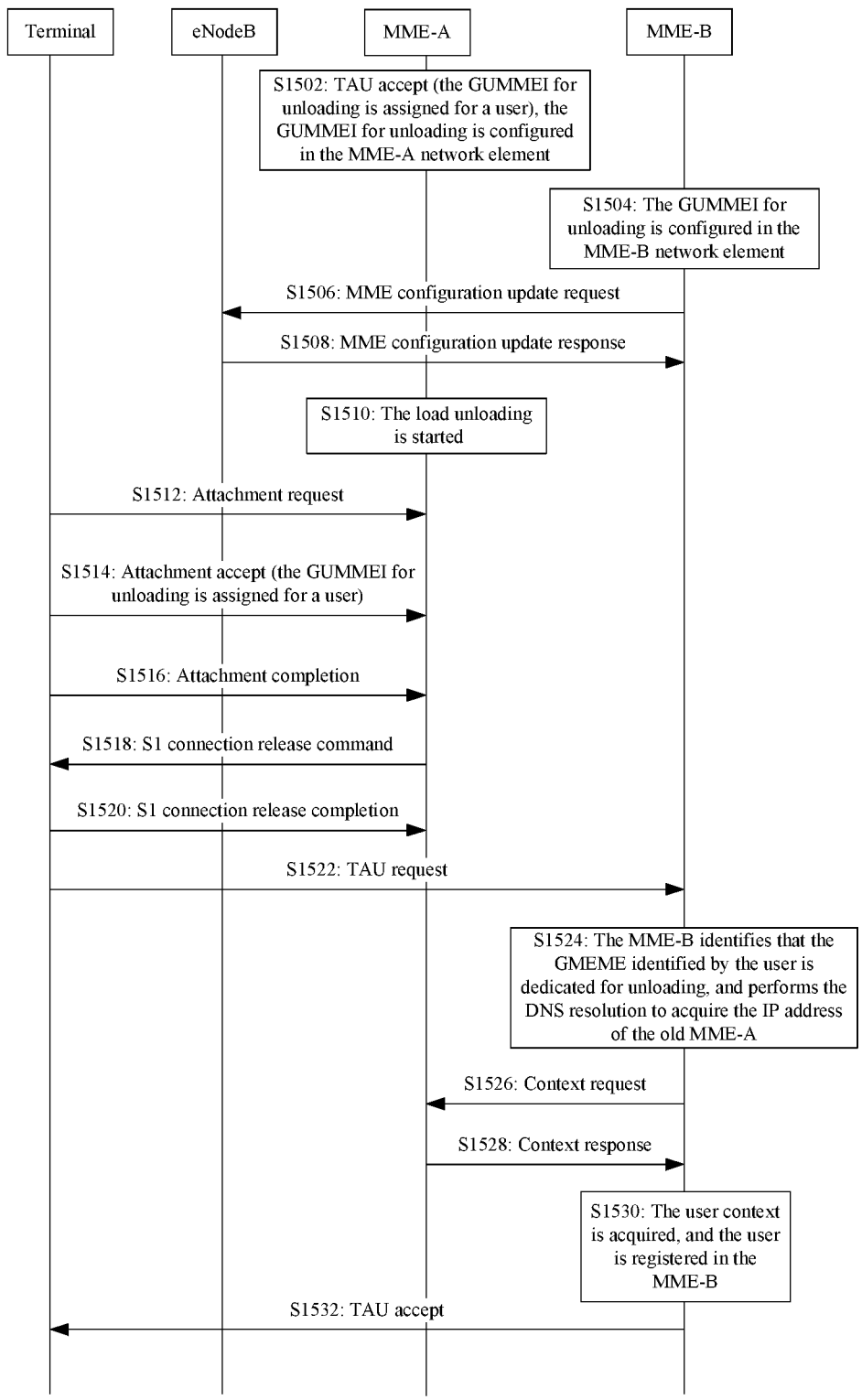
FIG. 15 is a schematic diagram of an MME load unloading according to a second example embodiment of the disclosure.

FIG. 15 is a schematic diagram of an MME load unloading according to a second example embodiment of the disclosure. One embodiment of the disclosure of the MME load unloading is as shown in FIG. 15. After starting the load unloading, an MME-A receives a attachment service initiated by a user, assigns a GUMMEI dedicated for unloading for the user so that the user selects an unloaded target MME-B at a next TAU, and finally the user is unloaded to the specified MME-B. The following steps are included.

Step S1502: The GUMMEI dedicated for unloading is configured in the MME-A as an unloading source before the load is unloaded.

Step S1504: The GUMMEI dedicated for unloading is configured in the MME-B as an unloading target before the load is unloaded.

Step S1506: The MME-B sends an MME configuration update request message to the eNodeB, which carries the GUMMEI supported by the MME-B and contains the GUMMEI dedicated for unloading.

Step S1508: The eNobeB returns the configuration update response message, indicating that configuration modification has been accepted.

Step S1510: The MME-A network element starts the load unloading by operating a maintenance and management tool.

Step S1512: The MME-A receives an attachment request initiated by a terminal.

Step S1514: The MME-A assigns the GUMMEI dedicated for unloading for the terminal, and carries the GUMMEI in a attachment accept message.

Step S1516: The terminal returns a attachment completion.

Step S1518: The MME-A initiates 51 connection release.

Step S1520: The terminal returns 51 connection release completion.

Step S1522: The terminal issues a TAU request message again, and the eNobeB network element selects the user to the MME-B based on the GUMMEI therein.

Step S1524: The MME-B identifies that the GMEME identified by the user is dedicated for unloading, and performs a DNS resolution to acquire an IP address of the old MME-A.

Step S1526: The MME-B initiates a context request message to the MME-A.

Step S1528: The MME-A returns a context response message carrying the user context information of the terminal.

Step S1530: The MME-B saves the user context information of the terminal, and the terminal is registered in the MME-B.

Step S1532: The MME-B returns a TAU accept message to the terminal.

Figure 16:
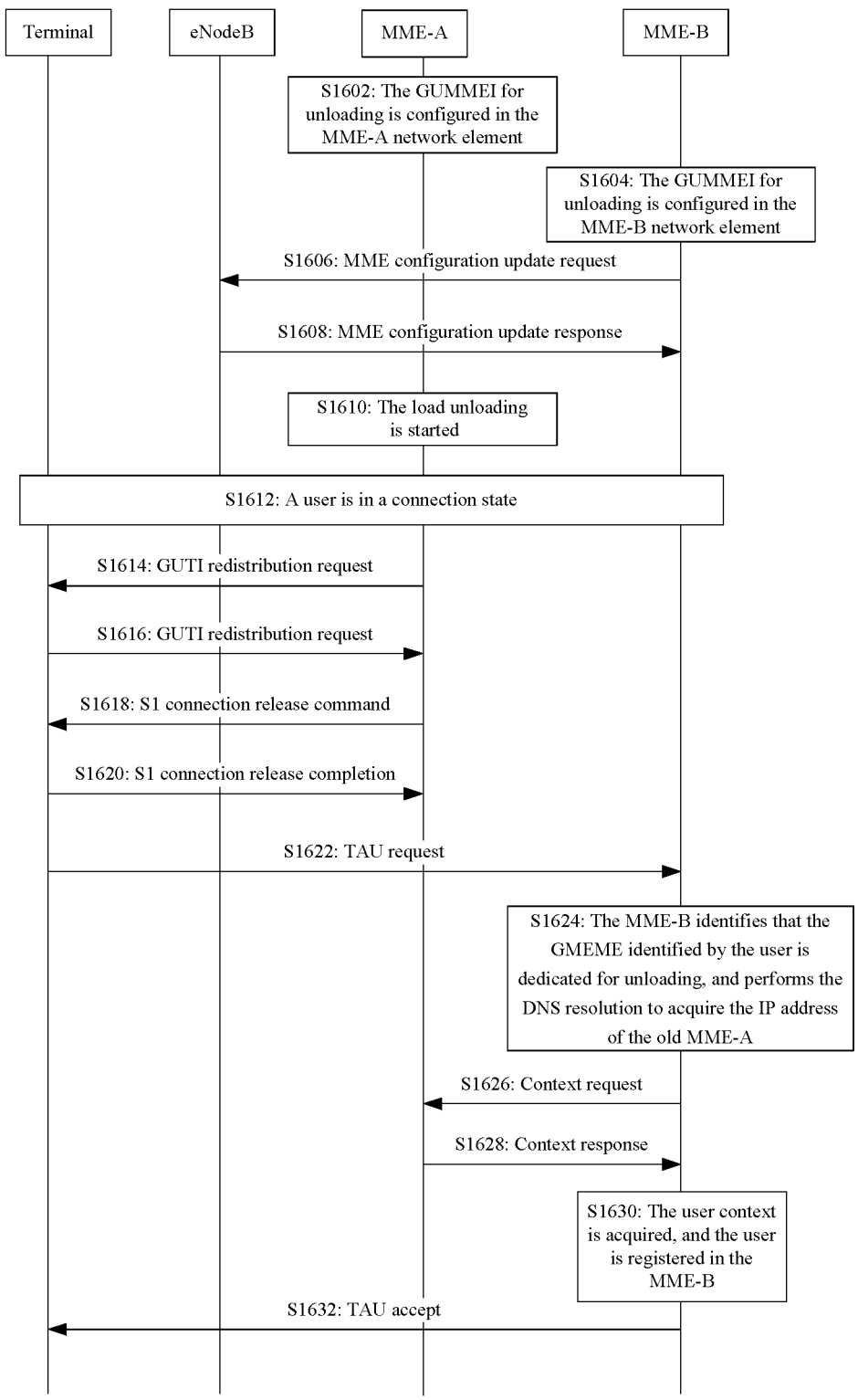
FIG. 16 is a schematic diagram of an MME load unloading according to a third example embodiment of the disclosure.

FIG. 16 is a schematic diagram of an MME load unloading according to a third example embodiment of the disclosure. One embodiment of the disclosure of the MME load unloading is as shown in FIG. 16. After starting the load unloading, an MME-A scans and detects a user in a connection state, and assigns a GUMMEI dedicated for unloading for the user by a process of redistributing a GUTI so that the user selects a target MME-B at a next TAU after a terminal used by the user is unloaded from the MME-A, and finally the user is unloaded to the specified MME-B. The following steps are included specifically.

Step S1602: The GUMMEI dedicated for unloading is configured in the MME-A as an unloading source before the load is unloaded.

Step S1604: The GUMMEI dedicated for unloading is configured in the MME-B as an unloading target before the load is unloaded.

Step S1606: The MME-B sends an MME configuration update request message to the eNodeB, which carries the GUMMEI supported by the MME-B and contains the GUMMEI dedicated for unloading.

Step S1608: The eNobeB returns the configuration update response message, indicating that configuration modification has been accepted.

Step S1610: The MME-A network element starts the load unloading by operating a maintenance and management tool.

Step S1612: The MME-A detects a user in a connection state.

Step S1614: The MME-A assigns the GUMMEI dedicated for unloading for the terminal, and carries the GUMMEI in a GUTI redistribution request message.

Step S1616: The terminal returns a GUTI redistribution completion message.

Step S1618: The MME-A initiates 51 connection release.

Step S1620: The terminal returns 51 connection release completion.

Step S1622: The terminal issues a TAU request message again, and the eNobeB network element selects the user to the MME-B based on the GUMMEI therein.

Step S1624: The MME-B identifies that the GMEME identified by the user is dedicated for unloading, and performs a DNS resolution to acquire an IP address of the old MME-A.

Step S1626: The MME-B initiates a context request message to the MME-A.

Step S1628: The MME-A returns a context response message carrying the user context information of the terminal.

Step S1630: The MME-B saves the user context information of the terminal, and the terminal is registered in the MME-B.

Step S1632: The MME-B returns a TAU accept message to the terminal.

By the above steps, the MME load unloading is used, so that a user can be unloaded to the specified MME, which facilitates the network maintenance of the operator.

Obviously, those skilled in the art should know that each component or step of the embodiment of the disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, and, in some cases, the steps shown or described may be performed in a order different from the order herein, or the components or steps may form each integrated circuit component, or multiple components or steps therein may form a single integrated circuit component for implementation. As a consequence, the disclosure is not limited to any specific hardware and software combination.

The above are only example embodiments of the disclosure and not intended to limit the disclosure, and for the technician of the field, the disclosure may have various modifications and variations. Any modifications, equivalent replacements, improvements and the like within the spirit and principle of the disclosure shall fall within the scope of protection as defined in the disclosure.

INDUSTRIAL APPLICABILITY

As described above, with the above embodiments and example embodiments, a problem in the related art that a user in an MME cannot be migrated to another specified MME is solved, and an effect that the user can be unloaded to the other specified MME is achieved.

What is claimed is:

1. A method for processing terminal unloading, comprising:
   configuring, by a source Mobility Management Entity (MME), a mobility management entity identity for a terminal to be unloaded, wherein the mobility management entity identity is used for indicating the terminal to register to a target MME configured with the mobility management entity identity after the terminal is unloaded from the source MME, and the mobility management entity identity is pre-configured on the source MME; and
   performing, by the source MME, unloading for the terminal;
   receiving, by the source MME, a context request message from the target MME, wherein the context request message is sent after the target MME receives a message which carries the mobility management entity identity, determining that the terminal is unloaded from the source MME according to the mobility management entity identity, and acquiring an address of the source MME;
   sending, by the source MME, a response message to the target MME, wherein the response message carries context information of the terminal.

2. The method as claimed in claim 1, wherein
   before configuring, by the source MME, the mobility management entity identity for the terminal to be unloaded, the method further comprises: receiving, by the source MME, a Tracking Area Update (TAU) request or an attachment request sent by the terminal; and
   after configuring, by the source MME, the mobility management entity identity for the terminal to be unloaded, the method further comprises: carrying, by the source MME, a Globally Unique MME (GUMME) in a TAU accept message or an attachment accept message.

3. The method as claimed in claim 1, wherein
   before configuring, by the source MME, the mobility management entity identity for the terminal to be unloaded, the method further comprises: detecting, by the source MME, that the terminal is in a connection state; and
   after configuring, by the source MME, the mobility management entity identity for the terminal to be unloaded, the method further comprises: carrying, by the source MME, the mobility management entity identity in a Globally Unique Temporary UE identity (GUTI) redistribution request message.

4. The method as claimed in claim 1, wherein the mobility management entity identity is a Globally Unique MME identity (GUMMEI).

5. A method for processing terminal registration, comprising:
   receiving, by a target Mobility Management Entity (MME), a message, wherein the message carries a mobility management entity identity, which is used for indicating a terminal to register to the target MME configured with the mobility management entity identity after the terminal is unloaded from a source MME, and the mobility management entity identity is pre-configured on the source MME; and
   registering, by the target MME, the terminal on the target MME according to the mobility management entity identity;
   wherein the target MME registers the terminal on the target MME according to the mobility management entity identity comprises: determining, by the target MME, that the terminal is unloaded from the source MME according to the mobility management entity identity; acquiring, by the target MME, an address of the source MME, and initiating a context request message to the source MIME; and acquiring, by the target MME, context information of the terminal from a response message, which corresponds to the context request message and is sent by the source MME, and saving, by the target MME, the context information.

6. The method as claimed in claim 5, wherein the target MME receives the message, comprising:
   receiving, by the target MME, a Tracking Area Update (TAU) request message sent by a base station, wherein the TAU request message carries the mobility management entity identity, and the TAU request message is sent from the terminal to the base station after the terminal is unloaded from the source MME.

7. The method as claimed in claim 5, wherein the mobility management entity identity is a Globally Unique MME identity (GUMMEI).

8. A device for processing terminal unloading, applied to a source Movement Management Entity (MME), comprising a hardware processor and a memory, and the hardware processor is configured to execute program components stored on the memory, the program components comprising:
   a configuring component arranged to configure a mobility management entity identity for a terminal to be unloaded, wherein the mobility management entity identity is used for indicating the terminal to register to a target MME configured with the mobility management entity identity after the terminal is unloaded from the source MME, and the mobility management entity identity is pre-configured on the source MME; and
   an unloading component arranged to perform unloading for the terminal;
   wherein the hardware processor is further arranged to receive a context request message from the target MME, wherein the context request message is sent after the target MME receive a message which carries the mobility management entity identity, determines that the terminal is unloaded from the source MME according to the mobility management entity identity, and acquires an address of the source MME; send a response message to the target MME, wherein the response message carries context information of the terminal.

9. The device as claimed in claim 8, wherein the program components further comprises:
   a first receiving component arranged to receive a Tracking Area Update (TAU) request or an attachment request sent by the terminal before the source MME configures the mobility management entity identity for the terminal to be unloaded; and a first carrying component arranged to carry a Globally Unique MME (GUMME) in a TAU accept message or an attachment accept message after the source MME configures the mobility management entity identity for the terminal to be unloaded.

10. The device as claimed in claim 8, wherein the program components further comprises:
a detecting component arranged to detect that the terminal is in a connection state before the source MME configures the mobility management entity identity for the terminal to be unloaded; and
a second carrying component arranged to carry the GUMME in a Globally Unique Temporary UE identity (GUTI) redistribution request message after the source MME configures the mobility management entity identity for the terminal to be unloaded.

11. A device for processing terminal registration, applied to a target Mobility Management Entity (MME), comprising a hardware processor and a memory, and the hardware processor is configured to execute program components stored on the memory, the program components comprising:
a second receiving component arranged to receive a message, wherein the message carries a mobility management entity identity, which is used for indicating a terminal to register to the target MME configured with the mobility management entity identity after the terminal is unloaded from a source MME, and the mobility management entity identity is pre-configured on the source MME; and
a first registering component arranged to register the terminal on the target MME according to the mobility management entity identity;
wherein the the first registering component comprises: a determining element arranged to determine that the terminal is unloaded from the source MME according to the mobility management entity identity; an initiating element arranged to acquire an address of the source MME, and initiate a context request message to the source MIME; and an acquiring element arranged to acquire context information of the terminal from a response message, which corresponds to the context request message and is sent by the source MME, and save the context information.

12. The device as claimed in claim 11, wherein the second receiving component comprises:
a receiving element arranged to receive a Tracking Area Update (TAU) request message sent by a base station, wherein the TAU request message carries the mobility management entity identity, and the TAU request message is sent from the terminal to the base station after the terminal is unloaded from the source MME.

* * * * *